(12) United States Patent
de Jong et al.

(10) Patent No.: US 7,181,737 B2
(45) Date of Patent: Feb. 20, 2007

(54) METHOD AND APPARATUS FOR DEPLOYMENT OF HIGH INTEGRITY SOFTWARE USING STATIC PROCEDURE RETURN ADDRESSES

(75) Inventors: Eduard de Jong, San Mateo, CA (US); Pieter H. Hartel, Enschede (NL)

(73) Assignee: Sun Microsystems, Inc., Santa Clara, CA (US)

( * ) Notice: Subject to any disclaimer, the term of this patent is extended or adjusted under 35 U.S.C. 154(b) by 546 days.

(21) Appl. No.: 10/100,838

(22) Filed: Mar. 18, 2002

(65) Prior Publication Data

US 2003/0177474 A1 Sep. 18, 2003

(51) Int. Cl.
*G06F 9/45* (2006.01)

(52) U.S. Cl. .................. 717/154; 717/140; 717/141; 717/148; 717/151; 717/160

(58) Field of Classification Search ........ 717/127–153; 719/328; 712/207–239; 718/108; 713/200
See application file for complete search history.

(56) References Cited

U.S. PATENT DOCUMENTS

| | | | | |
|---|---|---|---|---|
| 4,734,568 | A | 3/1988 | Watanabe | 235/487 |
| 5,107,418 | A | 4/1992 | Cramer et al. | 395/700 |
| 5,384,749 | A | 1/1995 | Lisart et al. | |
| 5,423,027 | A | 6/1995 | Jackson | 395/575 |
| 5,615,137 | A | 3/1997 | Holzmann et al. | 364/578 |
| 5,650,948 | A | 7/1997 | Gafter | 364/578 |
| 5,659,754 | A | 8/1997 | Grove et al. | 395/709 |
| 5,668,999 | A | 9/1997 | Gosling | 395/704 |
| 5,740,441 | A | 4/1998 | Yellin et al. | 395/704 |
| 5,748,964 | A | 5/1998 | Gosling | 395/705 |
| 5,790,859 | A | 8/1998 | Sarkar | 395/704 |
| 5,802,519 | A | 9/1998 | De Jong | 707/100 |
| 5,828,883 | A * | 10/1998 | Hall | 717/133 |
| 5,836,014 | A | 11/1998 | Faiman, Jr. | 395/707 |
| 5,887,161 | A | 3/1999 | Cheong et al. | |
| 5,968,169 | A * | 10/1999 | Pickett | 712/239 |
| 5,974,255 | A | 10/1999 | Gossain et al. | |
| 6,038,397 | A | 3/2000 | Iwanishi et al. | 395/709 |

(Continued)

FOREIGN PATENT DOCUMENTS

EP 0 390 339 10/1990

(Continued)

OTHER PUBLICATIONS

"*Memory Corruption Debugging System*", IBM Technical Disclosure Bulletin, IBM Corp., N.Y., Jan. 1, 1995, XP000498811, vol. 38, No. 1, pp. 395-400.

(Continued)

*Primary Examiner*—Kakali Chaki
*Assistant Examiner*—Mark P. Francis
(74) *Attorney, Agent, or Firm*—Gunnison, McKay & Hodgson, L.L.P.; Forrest Gunnison

(57) ABSTRACT

A method for statically allocating a procedure return address includes separating a software program including multiple procedures into a cyclic part and an acyclic part, allocating a static address for the return address of a procedure in the acyclic part and modifying at least one of the procedures to refer to the static address for the procedure return address.

52 Claims, 11 Drawing Sheets

U.S. PATENT DOCUMENTS

| | | | |
|---|---|---|---|
| 6,052,690 A | 4/2000 | de Jong | 707/101 |
| 6,094,656 A | 7/2000 | De Jong | 707/100 |
| 6,185,597 B1* | 2/2001 | Paterson et al. | 718/108 |
| 6,282,700 B1 | 8/2001 | Grover et al. | |
| 6,292,874 B1 | 9/2001 | Barnett | |
| 6,463,581 B1 | 10/2002 | Bacon et al. | |
| 6,526,571 B1 | 2/2003 | Aizikowitz et al. | |
| 6,604,190 B1* | 8/2003 | Tran | 712/207 |
| 6,634,019 B1* | 10/2003 | Rice et al. | 717/127 |
| 6,684,261 B1* | 1/2004 | Orton et al. | 719/328 |
| 6,718,485 B1 | 4/2004 | Reiser | 714/38 |
| 6,735,758 B1* | 5/2004 | Berry et al. | 717/130 |
| 6,957,422 B2* | 10/2005 | Hunt | 717/130 |
| 6,971,091 B1* | 11/2005 | Arnold et al. | 717/145 |
| 2002/0019969 A1 | 2/2002 | Hellestrand et al. | 716/5 |
| 2002/0097269 A1 | 7/2002 | Batcha et al. | 345/762 |
| 2002/0147903 A1 | 10/2002 | Hubert et al. | 713/1 |
| 2003/0097581 A1* | 5/2003 | Zimmer | 713/200 |
| 2004/0015920 A1* | 1/2004 | Schmidt | 717/153 |
| 2004/0103416 A1* | 5/2004 | Orton et al. | 719/328 |

FOREIGN PATENT DOCUMENTS

| | | |
|---|---|---|
| EP | 0 543 588 | 5/1993 |
| EP | 0 605 872 A1 | 7/1994 |
| EP | 0 751 458 A1 | 1/1997 |
| EP | 0 821 305 A2 | 1/1998 |
| EP | 1 056 002 | 11/2000 |
| FR | 2 806 813 | 3/2000 |
| WO | 94/24673 | 10/1994 |
| WO | 98/19237 | 5/1998 |
| WO | 99/24944 | 5/1999 |

OTHER PUBLICATIONS

"Pseudo-Dynamic Algorithm for Computer Memory Allocation", IBM Technical Disclosure Bulletin, IBM Corp., N.Y., Sep. 1, 1993, vol. 36, No. 9A, XP000396177, pp. 597-599.

A. Johan Cockx, "Whole Program Comilation for Embedded Software: The ADSL Experiment", Apr. 25-27, 2001, pp. 214-218.

International Search Report, PCT/FR 03/08508, International filing date Mar. 17, 2003.

International Search Report, PCT/FR 03/08506, International filing date Mar. 17, 2003, Search Report mailed Mar. 17, 2004.

Dean, Jeffrey, "ProfileMe: Hardware Support for Instruction-Level Profiling on Out-of- Order Processors", IEEE 1072-4451/97.

Dolby, Julian, "Automatic Inline Allocation of Objects", Concurrent Systems Architecture Group, Department of Computer Science, University of Illinois.

Zhao, Jianjun "Applying Program Dependence Analysis to Java Software" Fukuoka Kogyo Daigaku Kenkyu Ronshu (Research Bulletin of Fukuoka Institute of Technology), vol. 31, No. 1, pp. 29-41 1998.

Chan, "Infrastructure of Multi-Application Smart Card", http://home.hkstar.com/~alanchan/papers/multiApplicationSmartCard/, Jul. 25, 2002.

Chen, Zhiqun, "Java Card™ Technology for Smart Cards", Sun Microsystems, pp. 11-16, Jun. 2000.

Philips Semiconductor, "Designers offered first 16-bit smart card IC architecture with development tools", Press Release, Jul. 25, 2002.

Ritchey, Tim, "Advanced Topics: The Java Virtual Machine", Java!, Chapter 14, pp. 25-346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

Pieter H. Hartel, "Formalizing the Safety of Java, the Java Virtual Machine, and Java Card", ACM, pp. 517-558, Dec. 2001.

Qian et al., "A Formal Specification of Java™ Class Loading", CiteSeer, pp. 1-47, Jul. 2000.

Cap et al., "Extending the data storage capablities of a Java-based smartcard", IEEE, pp. 680-685, Jul. 2001.

Togethersoft Corporation, "Together Documentation Set: Together Getting Started Guide version 4.2", Online Manual, p. 26, lines 1-4, [Online] 2000. (XP002292559).

Attali, I. et al., "Smart Tools for Java Cards", Fourth Working Conference on Smart Card Research and Advanced Applications Bristol UK, pp. 155-174, [Online] Sep. 20, 2000. (XP002292560).

Martin, H. et al., "Automatic Test Generation for Java-Card Applets", Java on Smart Cards Programming and Security, Cannes, France, pp. 121-136, [Online] Sep. 14, 2000. (XP002292561).

Aho, A. et al., "Compilers Principles, Techniques, and Tools", Addison-Wesley Publishing Co, US, pp. 1-646, 1986. (XP002941830).

Vendicator, "Stack Shield Technical Info File v0.7", paragraph 5, [Online] Jan. 7, 2000. (XP002292774).

Chiueh, T. et al., "RAD: A Compile-Time Solution to Buffer Overflow Attacks", IEEE 21$^{st}$ International Conference on Distributed Computing Systems, Phoenix, AZ, USA, pp. 409-417, [Online] Apr. 16, 2001. (XP002292775).

Baentsch, M. et al., "Javacard- From Hype to Reality", IEEE Concurrency, vol. 7, No. 4, IEEE Service Center, Piscataway, NY, US, pp. 36-43, Oct. 1999. (XP000873322).

Allen, et al., "A Program Data Flow Analysis Procedure", Mar. 76, Comm. of the ACM, vol. 19, No. pp. 137-147.

Back, G. et al., "Java Operating Systems", Design and Implementation, Technical Report UUCS-98-015, Online!, Aug. 6, 1998, Dept. of Computer Science, Univ. of Utah, US (located at http://www.cs-tr.cornell.edu:80/Dienst/UI/1.0/Display/ncstrl.utahcs/UUCS098-015).

Dreifus, H., "Smart Cards; A Guide to Building and Managing Smart Card Applications; Copyright 1998; Publisher Robert Ipsen' "Smart Card Development Skills, Methods, and Tools"; pp. 159-176; 224-225.

Hecht, et al., "A Simple Algorithm for Global Data Flow Analysis Problems", Dec. 1975, SLAM Journal of Computing, vol. 4, No. 4, pp. 519-532.

Heiss, J. et al., "Java Card™ Technology Grows Up Smart", printed on Apr. 22, 2000 at http://java.sum.com/features/1990/01/javacard.html, 5 pages.

Helaihel, et al., "Java as a Specification Language for Hardware-Software Systems", IEEE 1997 (0-89791-993), pp. 8.

Kennedy, K., "A Global Flow Analysis Algorithm", 71', Intl. Journal of Comp. Math Sect. A., vol. 3, pp. 5-15.

Thomas David, J., "Smart and Smarter: The Emergence of Java Card™ Technology", printed on Apr. 22, 2000 from http://java/sun.com/features/1998/04/javacard.html, pp. 1-8.

Sun Microsystems, Inc., "Java TM Card TM Runtime Environment (JCRE) 2.1 Specification-Draft 2", printed Dec. 4, 1998m YS XO002138793 cited in the application p. 6-2 p. 6-10.

Sun Microsystems, Inc., "Smart Cards: A primer", printed on Apr. 22, 2000 from http://www.javaworld.com/javaworld/jw-12-19_b97/f_jw-12-javadev_p.html, pp. 1-13.

Sun Microsystems, Inc., "Java Card™ 2.1 Runtime Environment (JCRE) Specification", Jun. 7, 1999, Final Revision 1.1.

Aho, et al., Code Optimization, Mar. 1988, Compilers-Principles, Techniques, and Tools, Addison-Wesley Publishing Co., Chapter 10, pp. 585-722.

* cited by examiner

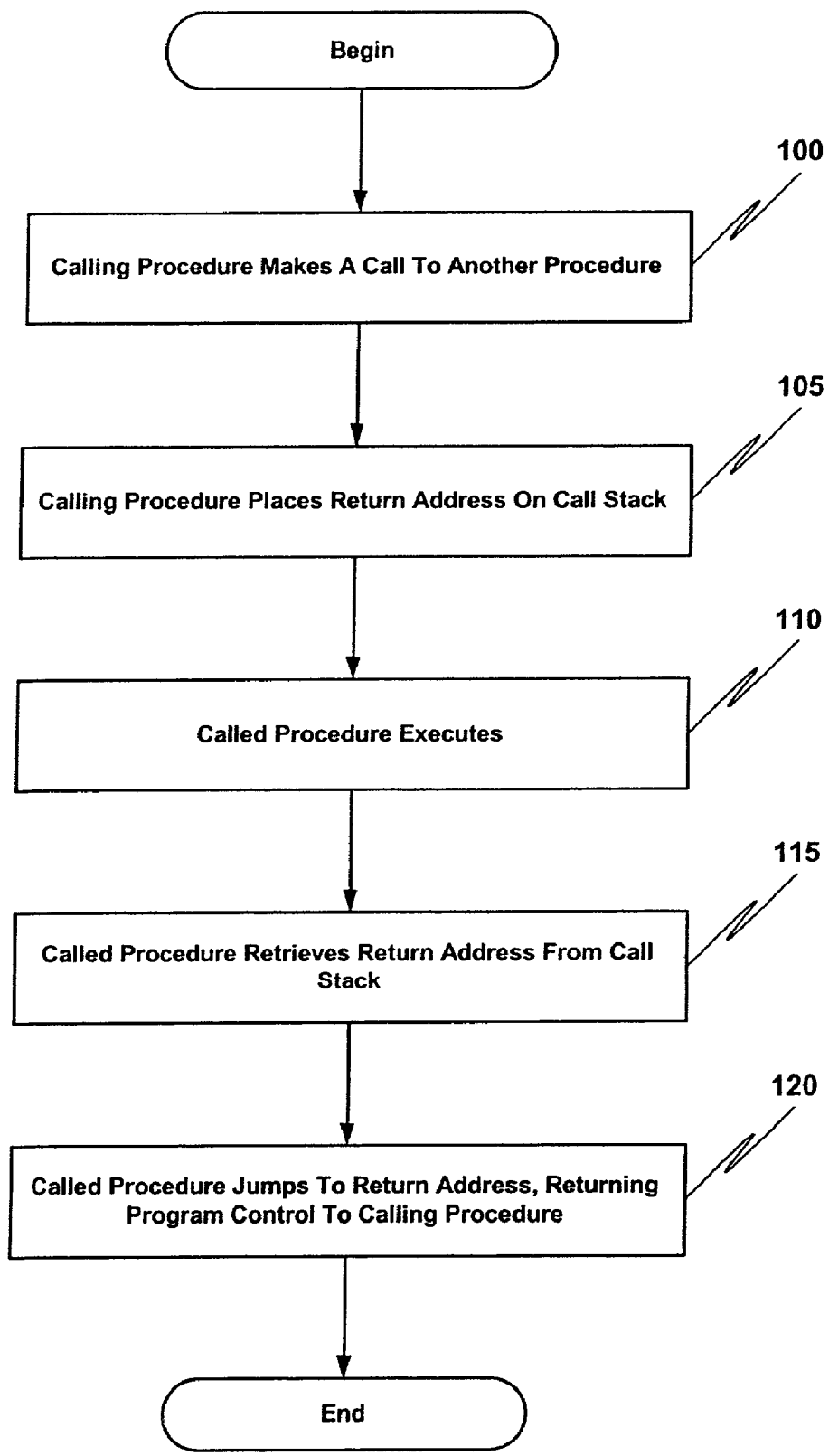
FIG. 1 - Prior Art

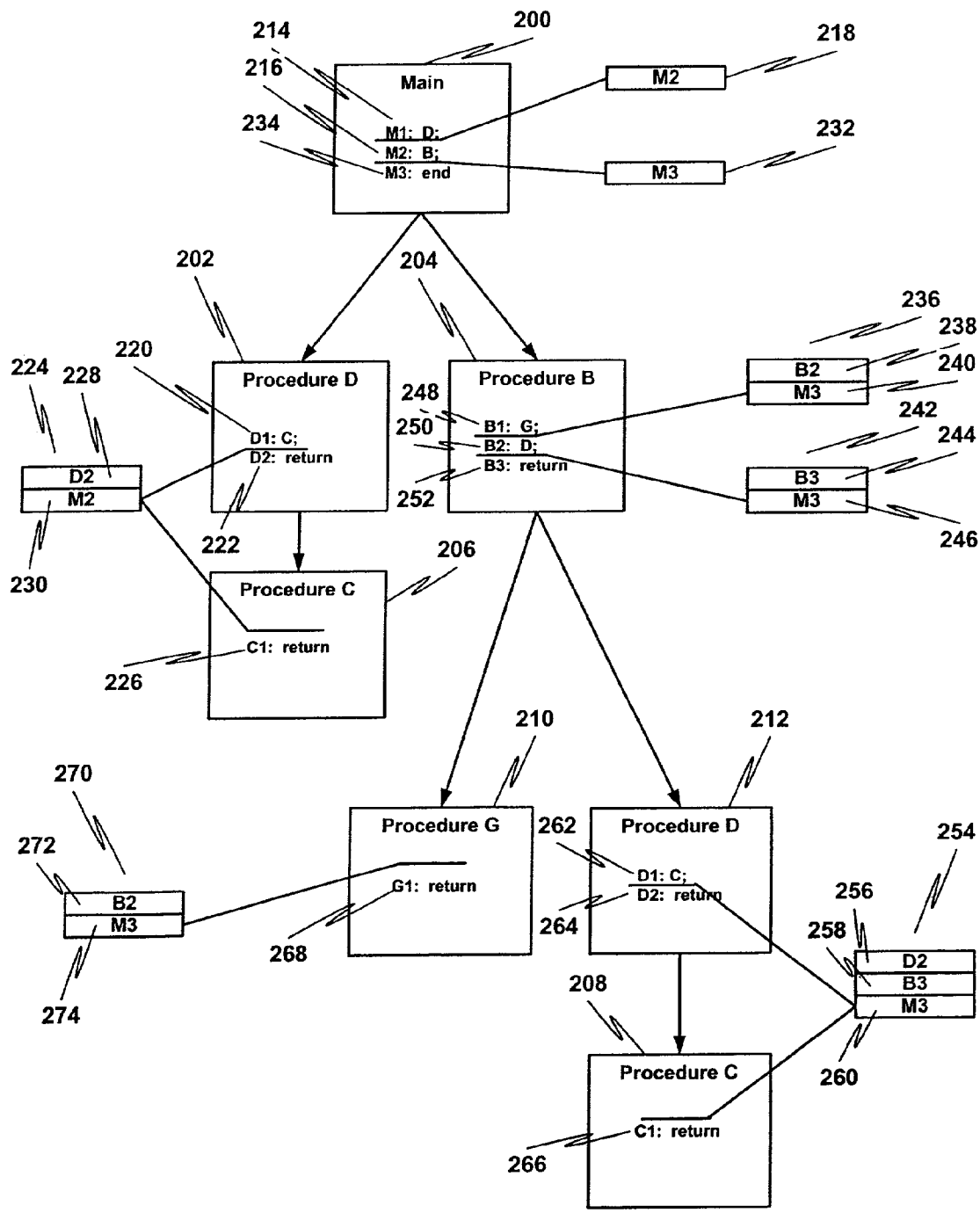
FIG. 2 - Prior Art

METHOD AND APPARATUS FOR DEPLOYMENT OF HIGH INTEGRITY SOFTWARE USING STATIC PROCEDURE RETURN ADDRESSES

CROSS REFERENCE TO RELATED APPLICATIONS

This application is related to the following:

U.S. patent application Ser. No. 10/101,296, filed Mar. 18, 2002 in the name of Eduard de Jong, entitled "Method and Apparatus for Deployment of High Integrity Software Using Initialization Order and Calling Order Constraints", commonly assigned herewith.

U.S. patent application Ser. No. 10/101,289, filed Mar. 18, 2002 in the name of Eduard de Jong, entitled "Method and Apparatus for Deployment of High Integrity Software Using Reduced Dynamic Memory Allocation", commonly assigned herewith.

FIELD OF THE INVENTION

The present invention relates to the field of computer science. More particularly, the present invention relates to a method and apparatus for deployment of high integrity software using static procedure return addresses.

BACKGROUND OF THE INVENTION

High integrity software is software that must be trusted to work dependably in some critical function, and whose failure to do so may have catastrophic results, such as serious injury, loss of life or property, business failure or breach of security. Some examples include software used in safety systems of nuclear power plants, medical devices, electronic banking, air traffic control, automated manufacturing, and military systems. The importance of high quality, low defect software is apparent in such critical situations. However, high integrity software is also important in more mundane business areas where defective software is often the norm.

Formal verification is the process of checking whether a design satisfies some requirements or properties. In order to formally verify a design, it must first be converted into a more condensed, verifiable format. The design is specified as a set of interacting systems, each having a finite number of configurations or states. States and transition between states constitute finite state machines (FSMs). The entire system is a FSM that can be obtained by composing the FSMs associated with each component. The first step in verification consists of obtaining a complete FSM description of the system. Given a present state (or current configuration), the next state (or successive configuration) of a FSM can be written as a function of its present state and inputs (transition function or transition relation). Formal verification attempts to execute every possible computational path with every possible state value to prove every possible state is consistent.

Software programs typically include multiple procedures. Each procedure may call another procedure or be called by another procedure. A program is recursive if at least one of its procedures may call itself, either directly or indirectly. When a calling procedure calls a called procedure, the address where program execution will resume upon completion of the called procedure needs to be stored. How this is done typically depends upon whether the programming language supports recursion.

Cyber FORTRAN (CDC Cyber 205 Fortran 66, Control Data Corporation, 1983) is an example of a non-recursive programming language. In Cyber FORTRAN, each procedure is associated with a static location used for storing its return address. When a calling procedure calls a called procedure, the calling procedure places the procedure return address in the static location used for storing the return address of the called procedure. When the called procedure completes execution, the procedure return address is obtained from the static location associated with the called procedure and program control is transferred to the procedure return address.

Computer languages that allow recursion typically use a portion of memory called a stack to maintain program state information between procedure calls. A stack is a last-in-first-out storage structure. One can put a new item on top of the stack at any time, and whenever one attempts to retrieve an item from the top of the stack it is always the one most recently added to the stack. A call stack is a stack used primarily to store procedure return addresses. When a calling procedure calls another procedure, the calling procedure places on the call stack the address where program execution should resume once the called procedure completes execution. When the called procedure completes execution, the procedure return address is obtained from the call stack and program execution resumes at the procedure return address.

One or more other stacks may be used to store parameter values (parameter stack) and local variables declared in called procedures (local stack). However, memory management complexity increases as the number of program stacks increase. An improvement is made possible by merging multiple stacks such as the call stack, parameter stack and local stack into a smaller number of stacks.

Turning now to FIG. 1, a flow diagram that illustrates a typical method for determining execution flow in a modular software program is presented. FIG. 1 illustrates call stack content during program execution. The parameter stack and local stack content is not illustrated in FIG. 1. At 100, a calling procedure makes a call to another procedure. The calling procedure determines what address the called procedure should return to once the called procedure completes. The return address is typically the address in the calling program immediately after where the called procedure was called. At 105, the calling procedure places the return address on the call stack. At 110, the called procedure executes. At 115, the called procedure retrieves the return address from the call stack. At 120, program control is transferred to the return address.

Turning now to FIG. 2, a block diagram that illustrates a typical method for determining execution flow in a modular software program is presented. FIG. 2 illustrates procedures Main (200), D (202), B (204), C (206, 208), G (210) and D (212). Three calling sequences are represented: Main-D-C, Main-B-G and Main-B-D-C. With regard to the Main-D-C calling sequence, procedure Main (200) calls procedure D (202) and procedure D (202) calls procedure C (206). Statement M1 (214) in procedure Main (200) is a call to procedure D (202). When the call to procedure D (202) completes, execution should resume at statement M2 (216) in procedure Main (200). Thus, before procedure Main (200) calls procedure D (202), the address for statement M2 (216) is placed on the call stack (218). Next, procedure D (202) is executed beginning with statement D1 (220).

Still referring to FIG. 2, statement D1 (220) is a call to procedure C (206). When the call to procedure C (206) completes, execution should resume at statement D2 (222) in procedure D (202). Thus, before procedure D (202) calls procedure C (206), the address for statement D2 (222) is placed on the call stack (224). At this point, the call stack (224) includes return address M2 (230) and D2 (228). Next, procedure C (206) is executed, beginning with statement C1 (226). Statement C1 (226) simply returns program control to the calling procedure, which is procedure D (202) in the present instance. At this point, the statement D2 return address (228) is retrieved from the call stack (224), leaving only the statement M2 return address (230) on the call stack. Next, execution resumes at statement D2 (222). Statement D2 (222) is also a return instruction, so the statement M2 return address (230) is retrieved from the call stack and execution resumes at statement M2 (216). Statement M2 (216) is a call to procedure B (204). The call stack is used in a similar fashion for the Main-B-G and Main-B-D-C calling sequences.

Unfortunately, using a call stack to store procedure return addresses makes the program susceptible to program execution flow manipulation through call stack modification. For example, a malicious programmer might manipulate program execution flow by writing procedure code that pushes a value onto the call stack. The value is pushed on top of the valid procedure return address. When execution of the procedure completes, a "return-from-procedure" instruction is executed, which pops the new value from the stack and transfers program control to the address represented by the value. Manipulating a call stack in this way allows the programmer to transfer program control to any address, regardless of the address validity and regardless of whether the proper initialization has been performed prior to transferring program control. The ability to modify the call stack in such a manner makes the program unpredictable and makes program verification relatively difficult.

Accordingly, what is needed is a solution that increases program verifiability. A further need exists for such a solution that prevents manipulation of program control flow merely by changing the call stack. A further need exists for such a solution that reduces stack management complexity.

SUMMARY OF THE INVENTION

A method for statically allocating a procedure return address includes separating a software program including multiple procedures into a cyclic part and an acyclic part, allocating a static address for the return address of a procedure in the acyclic part and modifying at least one of the procedures to refer to the static address for the procedure return address.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a flow diagram that illustrates a typical method for determining execution flow in a modular software program.

FIG. 2 is a block diagram that illustrates a typical method for determining execution flow in a modular software program.

DETAILED DESCRIPTION

Figure 3A:
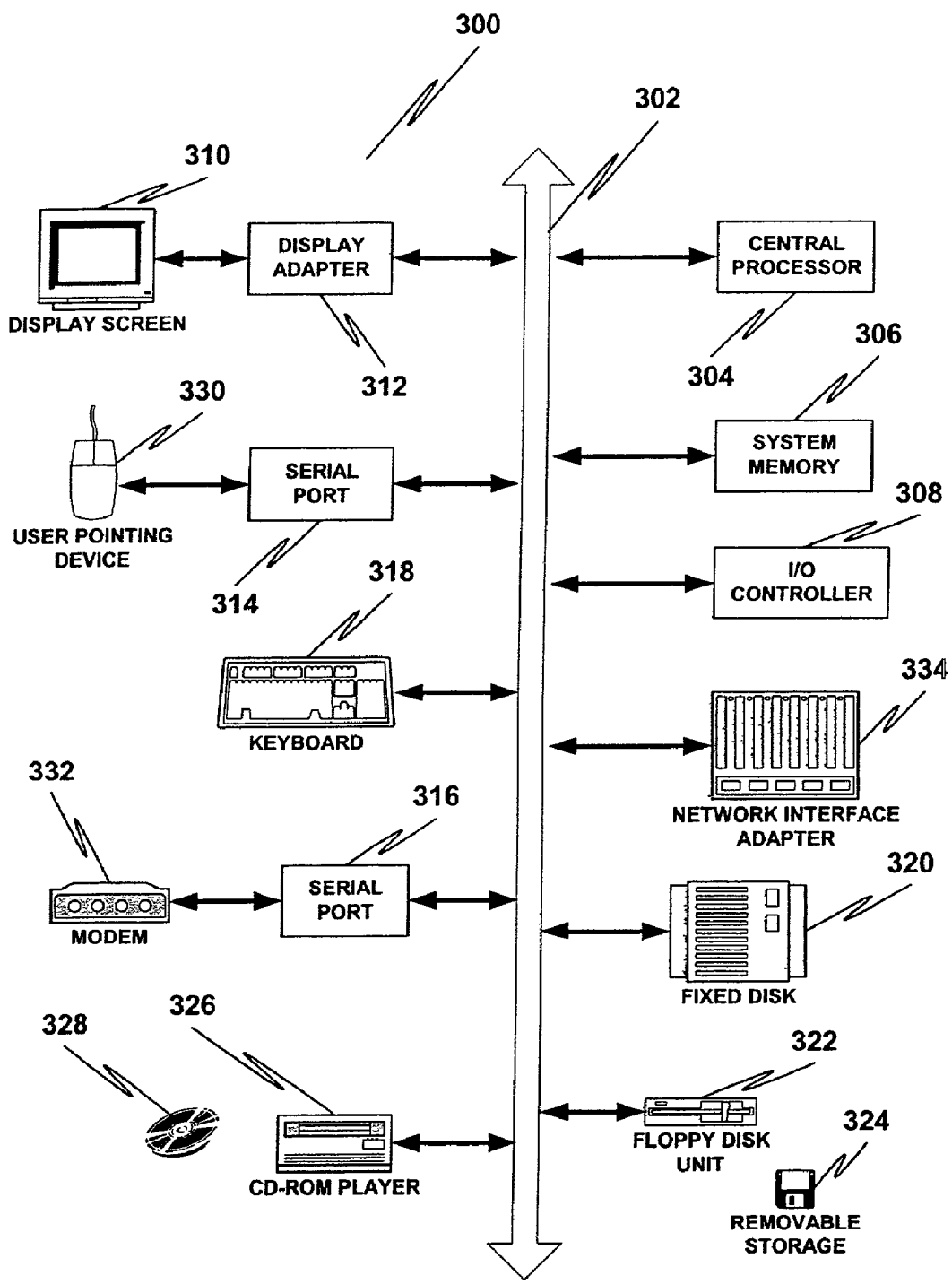
FIG. 3A is a block diagram of a computer system 400 suitable for implementing aspects of the present invention.

Embodiments of the present invention are described herein in the context of a method and apparatus for deployment of high integrity software using static procedure return addresses. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Palo Alto, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

According to embodiments of the present invention, a software program is separated into a cyclic part and an acyclic part and the software program is modified to use a static address for at least one procedure return address in the acyclic part.

FIG. 3A depicts a block diagram of a computer system 300 suitable for implementing aspects of the present invention. As shown in FIG. 3A, computer system 300 includes a bus 302 which interconnects major subsystems such as a central processor 304, a system memory 306 (typically RAM), an input/output (I/O) controller 308, an external device such as a display screen 310 via display adapter 312, serial ports 314 and 316, a keyboard 318, a fixed disk drive 320, a floppy disk drive 322 operative to receive a floppy disk 324, and a CD-ROM player 326 operative to receive a CD-ROM 328. Many other devices can be connected, such as a pointing device 330 (e.g., a mouse) connected via serial port 314 and a modem 332 connected via serial port 316. Modem 332 may provide a direct connection to a remote server via a telephone link or to the Internet via a POP (point of presence). Alternatively, a network interface adapter 334 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 3A to be present to practice the present invention, as discussed below. Furthermore, the devices and subsystems may be interconnected in different ways from that shown in FIG. 3A. The operation of a computer system such as that shown in FIG. 3A is readily known in the art and is not discussed in detail in this application, so as not to overcomplicate the present discussion. Code to implement the present invention may be operably disposed in system memory 306 or stored on storage media such as fixed disk 320, floppy disk 324 or CD-ROM 328.

For purposes of the present disclosure, a program specification refers to a model of a program design, expressed in terms of a strictly formalized language that is directly amenable to analysis using formal mathematical logic. A program specification may include one or more module specification where each module specification indicates other modules callable by the module. A program implementation refers to a software program written using a particular programming language.

Figure 3B:
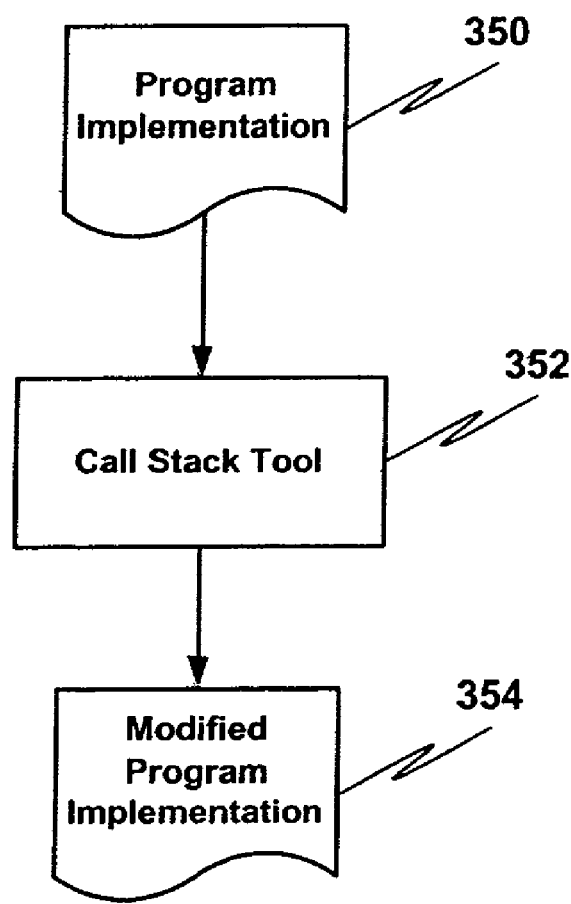
FIG. 3B is a block diagram that illustrates using a call stack tool to produce a program implementation having static procedure return addresses in accordance with one embodiment of the present invention.

Turning now to FIG. 3B, a block diagram that illustrates using a call stack tool to produce a program implementation having static procedure return addresses in accordance with one embodiment of the present invention is presented. A call stack tool 352 receives a program implementation 350. The call stack tool 352 separates the program implementation 350 into a cyclic part and an acyclic part, assigns a static procedure return address for each procedure in the acyclic part and modifies the program implementation 350 to use the static procedure return addresses in lieu of a call stack.

Figure 4:
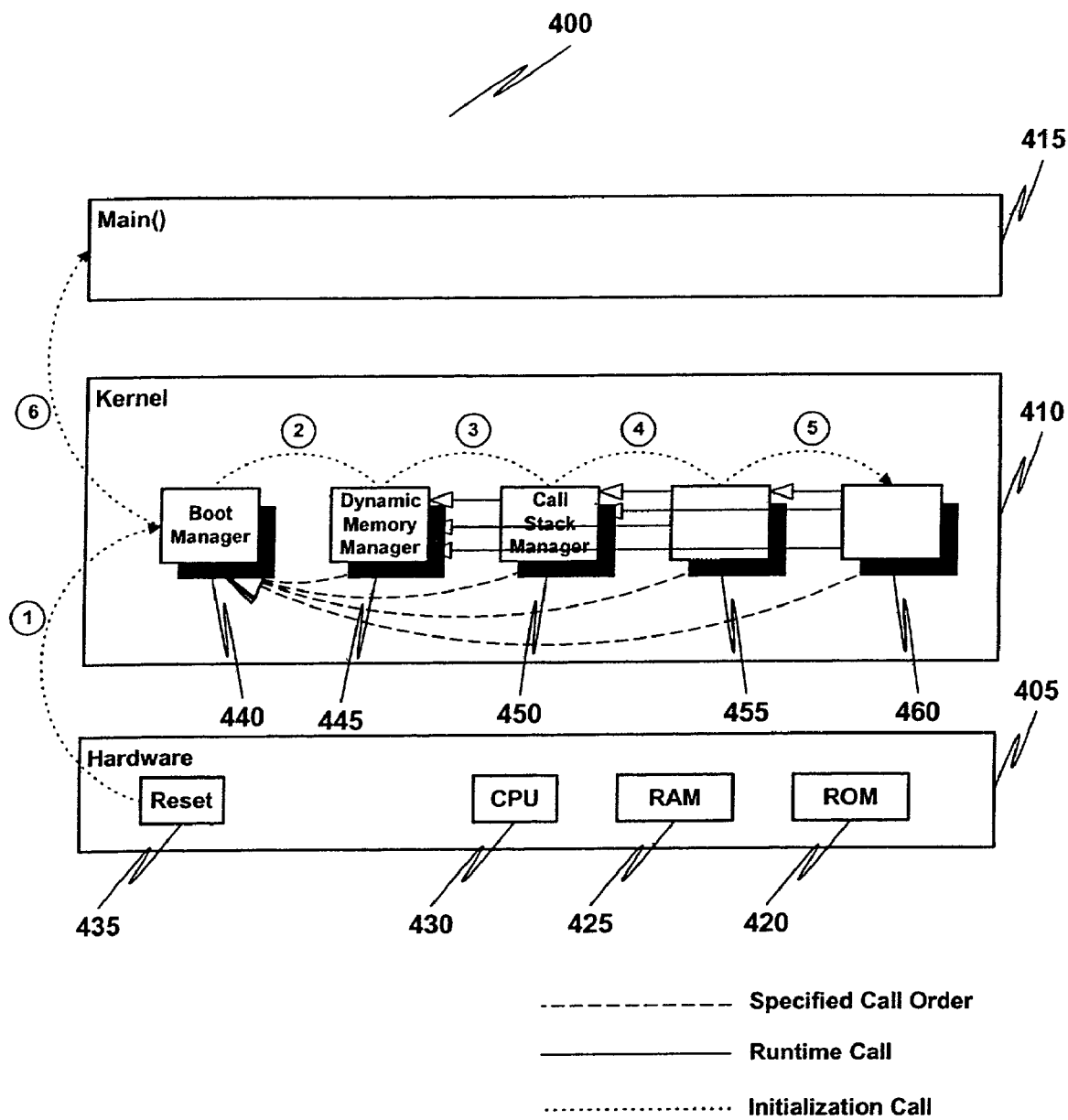
FIG. 4 is a block diagram that illustrates an apparatus for deployment of high integrity software using static procedure return addresses in accordance with one embodiment of the present invention.

Turning now to FIG. 4, a block diagram that illustrates an apparatus for deployment of high integrity software using static procedure return addresses in accordance with one embodiment of the present invention is presented. FIG. 4 includes a hardware component 405, a kernel component 410 and a main procedure component 415. Hardware component 405 includes a read-only memory (ROM) 420, a random access memory (RAM) 425, a reset indicator 435 and a central processing unit (CPU) 430.

Kernel component 410 includes executable code modules that include one or more procedures. Modules (440–460) include an initialization procedure to initialize the module (440–460). The initialization procedure must be called before other procedures within the module (440–460) are called. When apparatus 400 is reset, reset indicator 435 sends a signal to boot manager 440. Boot manager 440 calls the initialization procedure of at least one module (440–460) in a predetermined order. As shown in the example illustrated by FIG. 4, the initialization procedure for boot manager 440 is called first, followed by the initialization procedures for dynamic memory manager 445, call stack manager 450, module 455 and module 460.

Calling order constraints in system 400 correspond to the initialization order constraints. A calling module may call any module that occurs before the calling module in the initialization sequence. A special case exists for embodiments where the boot manager module 440 is an actual module rather than a placeholder. If the boot manager module 440 is an actual module, it is limited to calling the initialization procedure for any module (440–460). In the example illustrated by FIG. 4, module 460 may call modules 455, 450, 445 or 440. Module 455 may call modules 450, 445 or 440. Module 450 may call modules 445 or boot manager module 440. Module 445 may call boot manager module 440. Boot manager module 440 is limited to calling the initialization procedure for any of modules 445, 450, 455 or 460.

Still referring to FIG. 4, both call stack manager 450 and memory manager 445 are placeholders or formalizations of program elements. Memory manager 445 manages dynamic memory allocation requests from other modules. The dynamic memory allocation requests are analyzed to determine bounds on the allocations. The software program may be rewritten using a dynamic memory tool to replace dynamic memory allocation requests with static memory allocations as disclosed in U.S. patent application Ser. No. 10/101,289, filed Mar. 18, 2002 in the name of Eduard de Jong, entitled "Method and Apparatus for Deployment of High Integrity Software Using Reduced Dynamic Memory Allocation".

The call stack manager 450 allocates space for static, pre-allocated return addresses. The call stack manager 450 allocates the space by making a procedure call to the memory manager 445, including the memory allocation request. Since the call stack manager 450 must call or use the services of the memory manager 445, the call stack manager 450 is placed after the memory manager in the initialization sequence. Placing the call stack manager 450 formally early in the initialization sequence guarantees memory allocation for the static return addresses. It also guarantees static allocation of a memory area for a call stack. The call allows the memory manager 445 to reserve space for the static return addresses in its formal model of memory. The logic of the call stack manager is a call stack tool, which may rewrite modules to use static locations to store procedure return addresses, much like the dynamic memory tool may rewrite modules to replace dynamic memory requests with static memory allocations.

Figure 5:
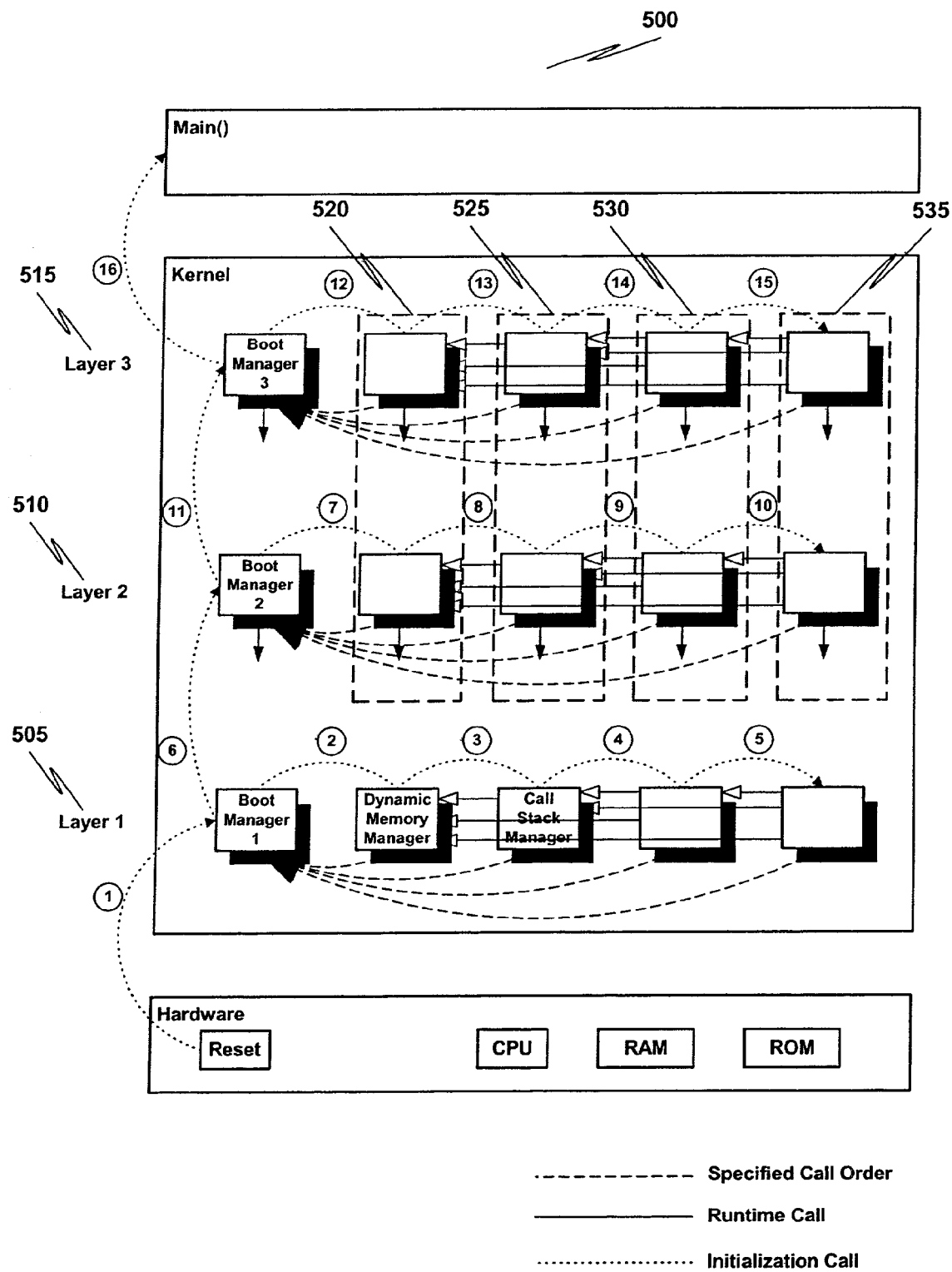
FIG. 5 is a block diagram that illustrates an apparatus for deployment of high integrity software using static procedure return addresses in a layered software design in accordance with one embodiment of the present invention.

Turning now to FIG. 5, a block diagram that illustrates an apparatus for deployment of high integrity software using static procedure return addresses in a layered software design in accordance with one embodiment of the present invention is presented. FIG. 5 is similar to FIG. 4, except that FIG. 5 includes multiple module layers. Layer 1 (505) includes modules that have relatively unrestricted functionality and are at a relatively low level of abstraction. Layer 3 (515) includes modules that have relatively restricted functionality and are at a relatively high level of abstraction.

System 500 may be further organized into columns of related functionality. Four columns of related functionality (520, 525, 530, 535) are shown in FIG. 5. In an exemplary arrangement, a layer 3 (515) module is an "Input/Output Manager" module that handles many types of high level input and output. A corresponding layer 2 (510) module is an "Buffer Input/Output" module that handles page-oriented input and output. A corresponding layer 1 (505) module is a "Byte Input/Output" module that handles low-level byte input and output. Those of ordinary skill in the art will recognize that many other groupings are possible.

FIGS. 4 and 5 are for purposes of illustration and are not intended to be limiting in any way. Those of ordinary skill in the art will recognize that embodiments of the present invention may employ other software architectures.

Figure 6A:
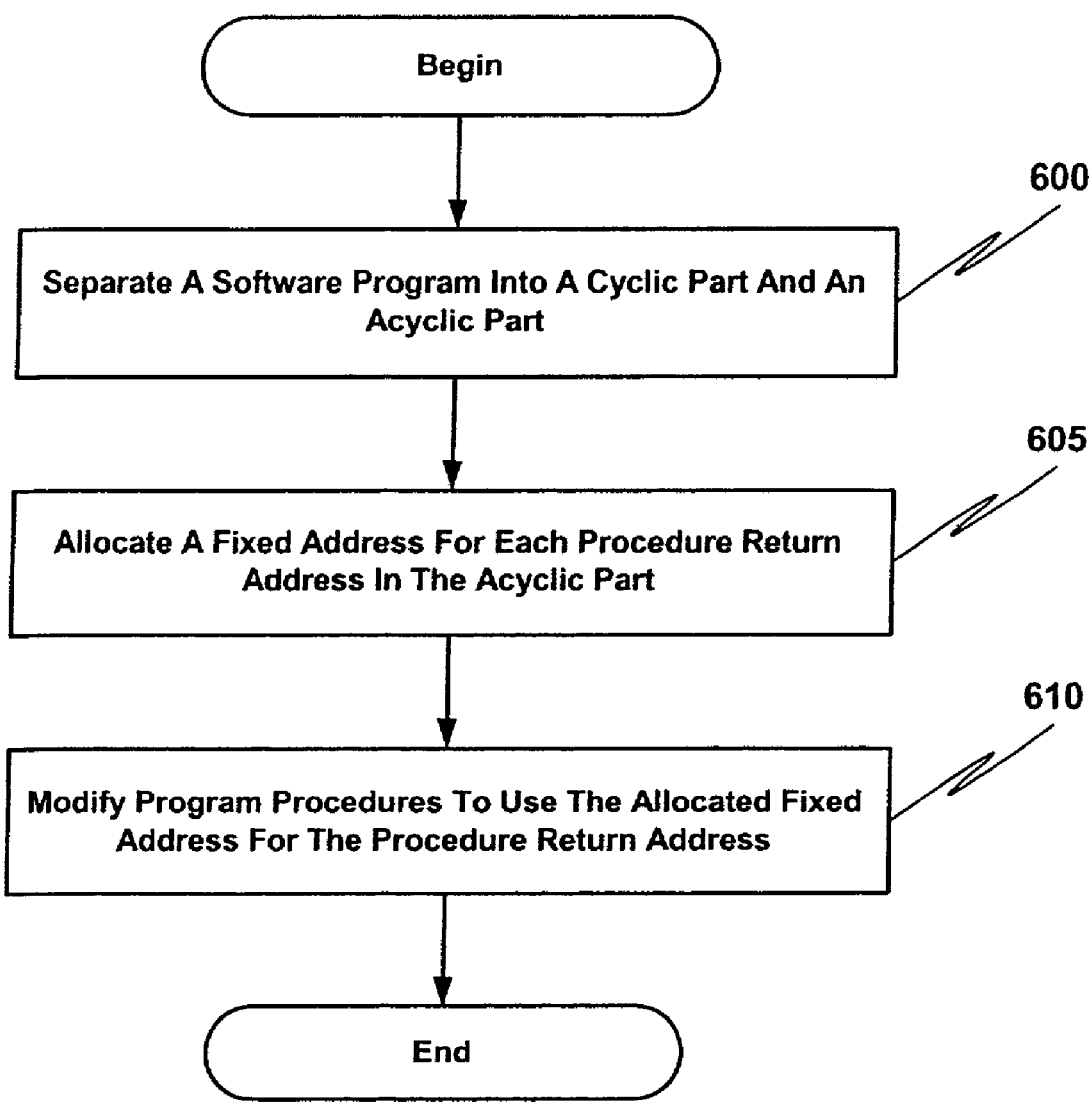
FIG. 6A is a flow diagram that illustrates a method for deployment of high integrity software using static procedure return addresses in accordance with one embodiment of the present invention.

Turning now to FIG. 6A, a flow diagram that illustrates a method for deployment of high integrity software using static procedure return addresses in accordance with one embodiment of the present invention is presented. At 600, a software program is separated into a cyclic part and an acyclic part. A set of procedures in the software program is cyclic if at least one of the possible execution paths within the set of procedures includes a path where a procedure calls itself, either directly or indirectly. For example, the set of procedures comprising procedures "A" and "B" are cyclic if "A" can call "A" or if "B" can call "B". The set of procedures is also cyclic if "A" can call "B" and "B" can call "A", or if "B" can call "A" and "A" can call "B". Those of ordinary skill in the art will recognize that additional levels of indirection are possible.

The software program may be separated into a cyclic part and an acyclic part using a call graph of the program, where every node of the graph represents a procedure and every directed line connecting two nodes represents one procedure calling another procedure. The call graph of a software program may include one or more cyclic parts and one or more acyclic parts. The acyclic part of the software program is represented by a directed acyclic graph (DAG) within the call graph. A calling sequence in the DAG is represented by the path from the root to a leaf. Because the calling sequence represented by such a DAG is nonrecursive, the address of any procedure in the calling sequence will occur at most one time in any call stack corresponding to the calling sequence. This allows a static address to be used for the procedure return address of each procedure in the DAG.

Figure 6B:
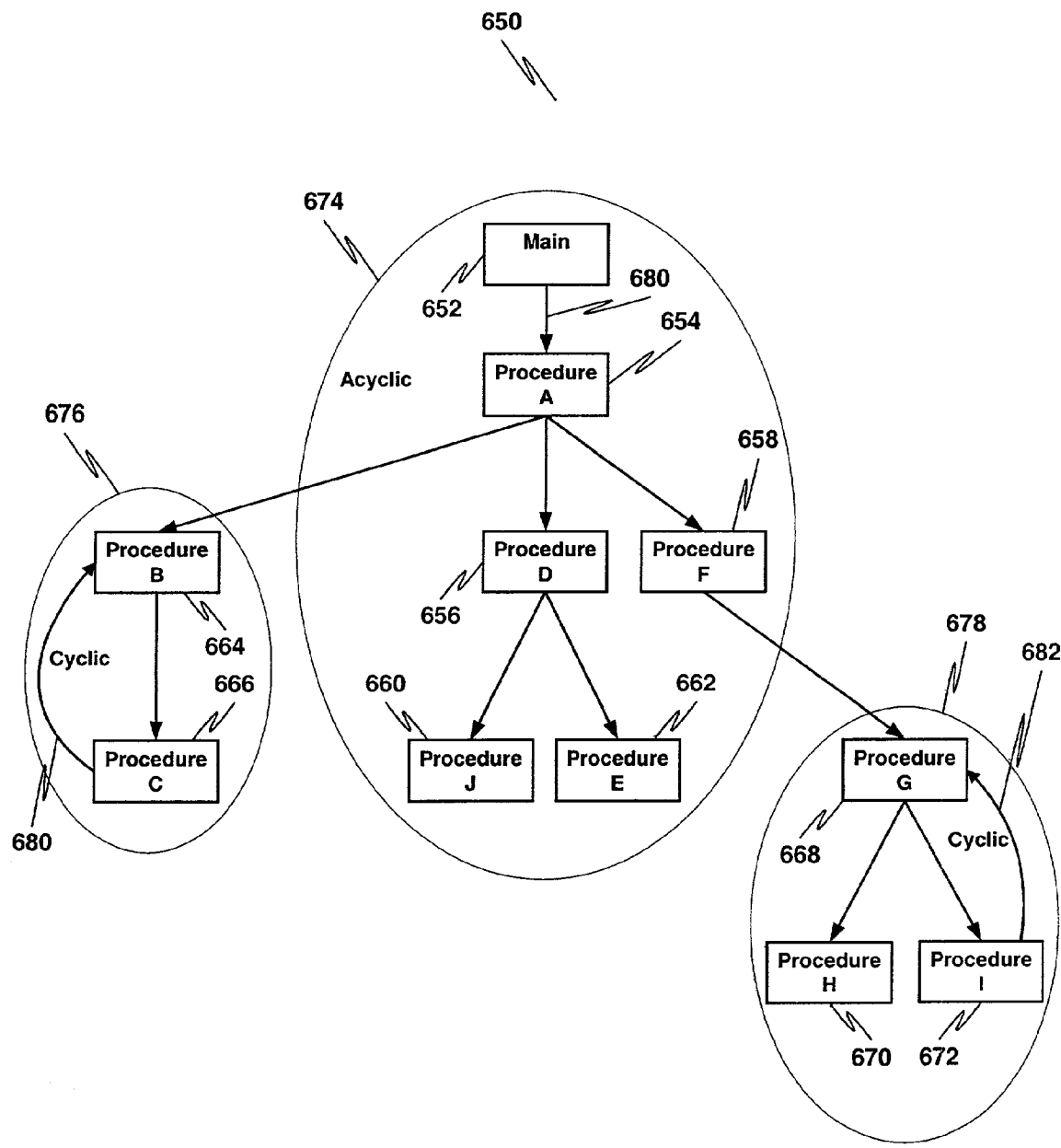
FIG. 6B is a call graph diagram that illustrates separating a software program into a cyclic part and an acyclic part in accordance with one embodiment of the present invention.

Turning now to FIG. 6B, a call graph diagram that illustrates separating a software program into a cyclic part and an acyclic part in accordance with one embodiment of the present invention is presented. Procedures in the call graph are represented by nodes 652–672. A procedure calling relationship is represented by a directed line originating with the calling procedure and terminating with the called procedure. By way of example, directed line 680 indicates procedure Main 652 calls procedure A (654). Call graph 650 is separated into an acyclic part 674, cyclic part 676 and cyclic part 678. Procedure call 680 makes part 676 cyclic and procedure call 682 makes part 678 cyclic Referring again to FIG. 6A, at 605 a static address is allocated for each procedure return address in the acyclic part. According to one embodiment of the present invention, the static address is allocated in a protected area of memory, thus enhancing security. According to another embodiment of the present invention, the static address is allocated to an area of memory that is private to a processor such as a virtual machine or a central processing unit (CPU).

Still referring to FIG. 6A, at 610 procedures in the program are modified to use the static addresses created at 605 for the respective procedure return addresses. Code for a procedure that calls a procedure in the acyclic part is modified to include an instruction that stores the procedure return address of the called procedure in the static address associated with the called procedure. Using FIG. 6B as an example, code for procedure main 652 is modified to include an instruction that stores the procedure return address of procedure A 654 in the static address associated with procedure A 654 and code for procedure A 654 is modified to include instructions that store the procedure return address for each of procedures D 656 and F 658 in the static addresses associated with procedures D 656 and F 658, respectively. Additionally, code for procedure D is modified to include instructions that store the procedure return address for each of procedures J 660 and E 662 in the static addresses associated with procedures J 660 and E 662, respectively.

Referring again to reference numeral 610 of FIG. 6A, code for the called procedures is also modified to retrieve the procedure return address from the static address associated with the called procedure and to transfer program control to the return address when execution of the called procedure completes. Using FIG. 6B as an example again, procedures J 660 and E 662 are modified to retrieve the procedure return address from the static address associated with procedures J 660 and E 662, respectively, and to transfer program control to the return address upon completion of procedure execution. Procedures D 656, F 658, A 654, B 664 and G 678 are similarly modified.

According to one embodiment of the present invention, the procedure return address is based upon the maximum depth of the procedure return address in all configurations of the call stack that include the procedure return address. This is illustrated in more detail below with respect to FIG. 7.

Figure 7:
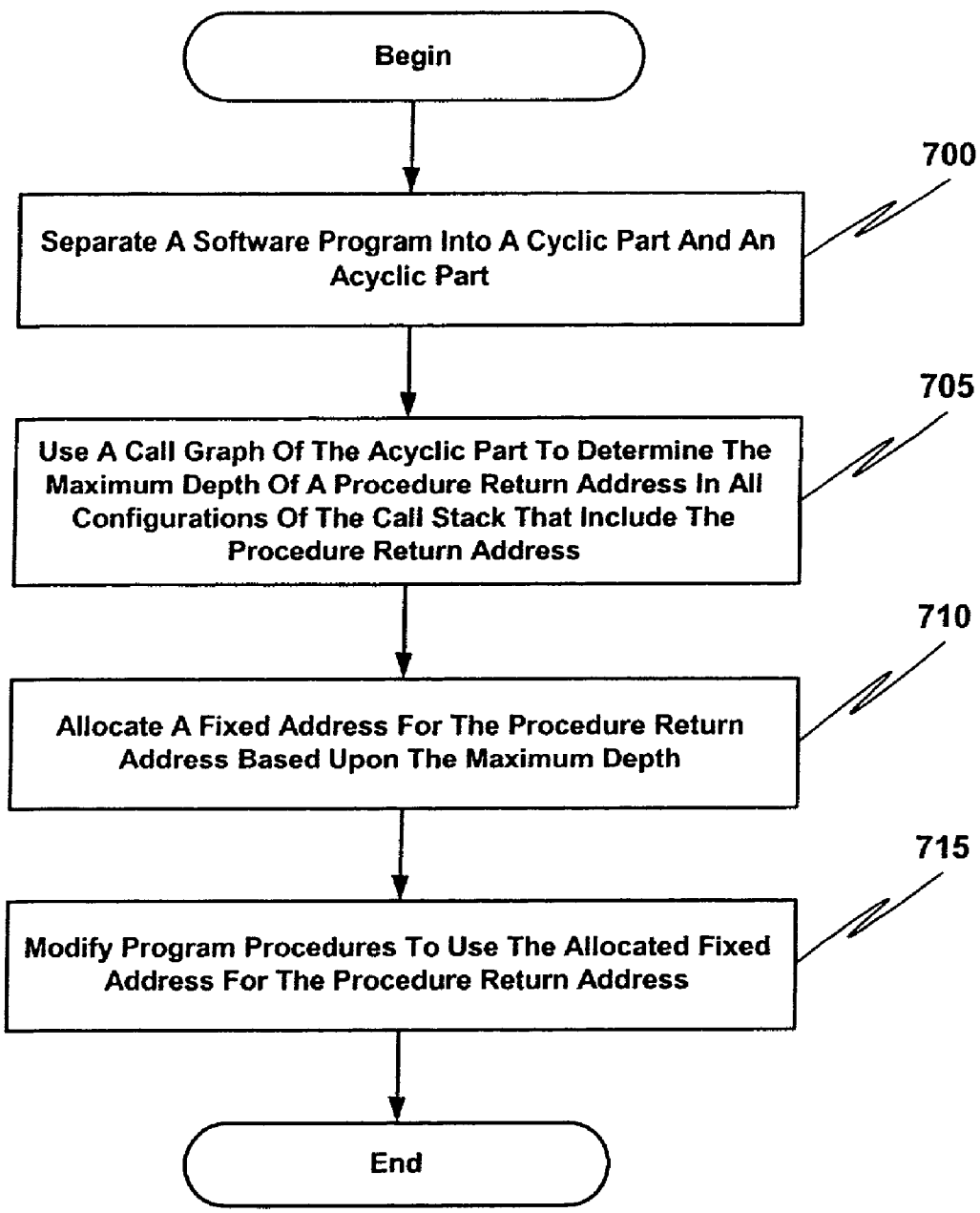
FIG. 7 is a flow diagram that illustrates a method for deployment of high integrity software using static procedure return addresses that is based upon the maximum depth of the procedure return address in all configurations of the call stack that include the procedure return address in accordance with one embodiment of the present invention.

Turning now to FIG. 7, a flow diagram that illustrates a method for deployment of high integrity software using static procedure return addresses that is based upon the maximum depth of the procedure return address in all configurations of the call stack that include the procedure return address in accordance with one embodiment of the present invention is presented. At 700, a software program is separated into a cyclic part and an acyclic part. At 705, a call graph of the acyclic part is used to determine the maximum call depth of a procedure return address in all configurations of the call stack that include the procedure return address. For example, suppose a program includes procedures "A", "B", "C" and "D". Suppose also that "A" calls "B" and "D", "B" calls "C" and "C" calls "D". With respect to the procedure call chain "A–D", the maximum depth of the procedure "D" return address in the call stack is 1. With respect to the procedure call chain "A–B–C–D", the maximum depth of the procedure "D" return address in the call stack is 3. Thus, in this example the static procedure return address for procedure "D" is based upon the number "3". The mechanism used to obtain the actual static procedure return address may be, by way of example, a table lookup mechanism that uses the maximum depth as an index.

Still referring to FIG. 7, at 710 a static address is allocated for the procedure return address. The static address is based upon the maximum depth determined at reference numeral 705. At 715, procedures in the program are modified to use the static address for the procedure return address. Using the above example, code for procedures "A" and "C" are modified to include an instruction that stores the procedure "D" return address in the static address associated with procedure "D". Likewise, code for procedure "D" is modified to retrieve the procedure "D" return address from the static address associated with procedure "D" and to transfer program control to the return address when execution of procedure "D" completes.

Figure 8:
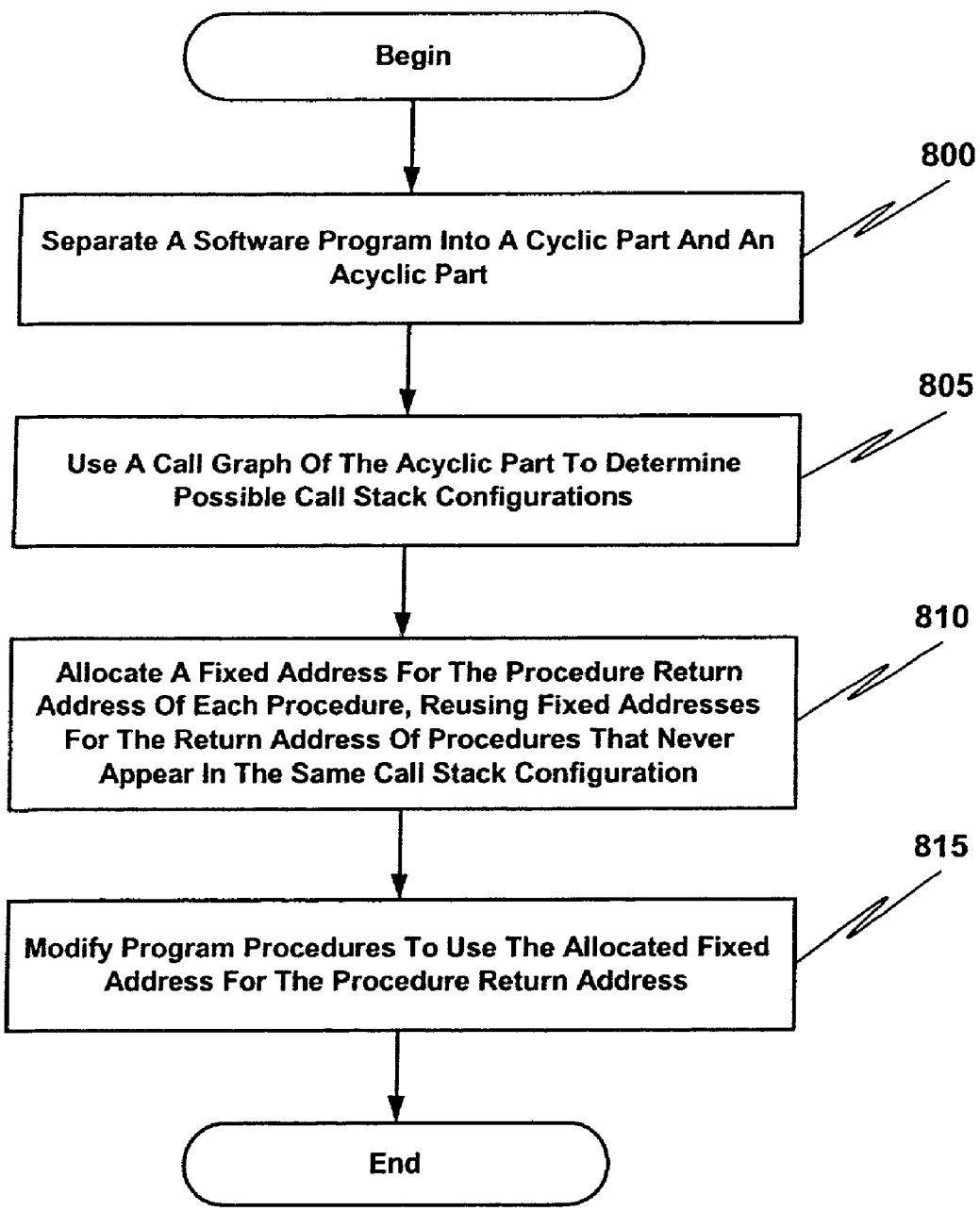
FIG. 8 is a flow diagram that illustrates a method for deployment of high integrity software using static procedure return addresses that may overlap with other procedure return addresses if the return addresses never appear in the same call stack configuration in accordance with one embodiment of the present invention.

Turning now to FIG. 8, a flow diagram that illustrates a method for deployment of high integrity software using static procedure return addresses that may overlap with other procedure return addresses if the return addresses never appear in the same call stack configuration in accordance with one embodiment of the present invention is presented. At 800, a software program is separated into a cyclic part and an acyclic part. At 805, a call graph of the acyclic part is used to determine possible call stack configurations. At 810, a static address is allocated for the procedure return address of each procedure in the acyclic part, reusing static addresses for the return address of procedures that never appear in the same call stack configuration. At 815, procedures in the program are modified to use the static address for the procedure return address.

According to one embodiment of the present invention, a "return N" instruction is used to return control to the calling procedure, where "N" refers to the static address for the procedure return address associated with the called procedure. Depending upon the program size, the return address may be built in to the encoding of the "return N" instruction. By way of example, if the depth of the call stack is less than 16 in an implementation that uses 8-bit instructions, four bits of the instruction may be used to indicate 16 different locations that contain return addresses. Encoding return address locations in this way makes manipulation of program control flow more difficult because the return address location is part of the instruction. According to another embodiment of the present invention, the "N" refers to an index into a table that includes return address locations. This is explained in more detail below with reference to FIG. 9.

Figure 9:
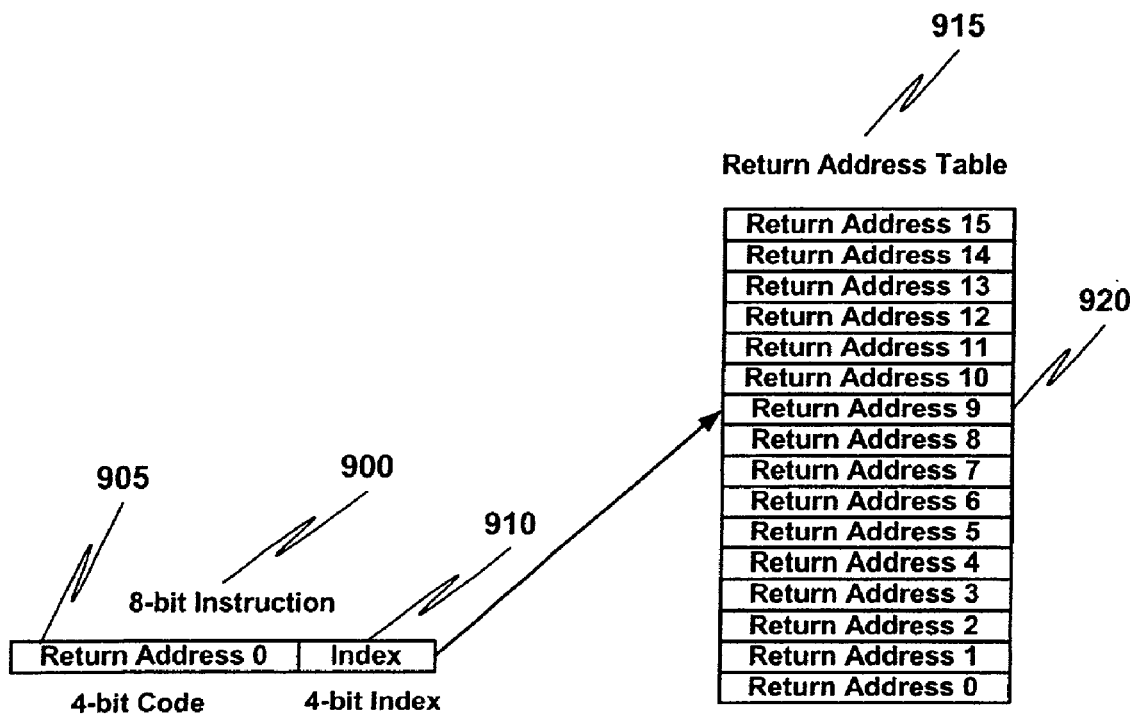
FIG. 9 is a block diagram that illustrates encoding in an instruction an index to a return address table in accordance with one embodiment of the present invention.

Turning now to FIG. 9, a block diagram that illustrates encoding in an instruction an index to a return address table in accordance with one embodiment of the present invention is presented. The 8-bit instruction 900 shown includes a 4-bit code 904 that identifies the instruction as a "return N" instruction and a 4-bit index 910. The index 910 refers to an offset 920 within a return address table 915 stored in a memory. Memory location 920 stores the return address for a procedure. Upon execution of instruction 900, index 910 is added to the base address for return address table 915 to obtain a memory location 920 that stores a procedure return address. Execution continues at the address stored at memory location 920.

The illustration above with respect an 8-bit instruction is not intended to be limiting in any way. Those of ordinary skill in the art will recognize that instructions having other sizes may be used.

According to one embodiment of the present invention, code modification is performed automatically by a tool such as a compiler or optimizer or the like. Those of ordinary skill in the art will recognize that other tools may be used to perform the code modification.

According to another embodiment of the present invention, a software program is modified to indicate the maximum size of a call stack during execution of the program. The maximum size of the call stack may be indicated using a parameter included in the software program. Alternatively, the maximum size of the call stack may be indicated using a "Set Call Stack Size" instruction in the software program.

According to another embodiment of the present invention, a processor such as a CPU, virtual machine or the like accepts a program for execution where the program itself includes an indication of the maximum size of the program's call stack during execution of the program. The maximum size of the call stack may be indicated using a parameter included in the software program. Alternatively, the maximum size of the call stack may be indicated using a "Set Call Stack Size" instruction in the software program. The processor may use this size information to build or allocate an area of memory for static procedure return addresses.

According to one embodiment of the present invention, a software program modified to use a static address for at least one procedure return address is targeted for execution on a resource-constrained device. Resource-constrained devices are generally considered to be those that are relatively restricted in memory and/or computing power or speed, as compared to typical desktop computers and the like. According to one embodiment of the present invention, the resource-constrained device comprises a smart card. According to another embodiment of the present invention, the smart card comprises a Java Card™ technology-enabled smart card. The invention can be used with other resource-constrained devices including, but not limited to, cellular telephones, boundary scan devices, field programmable devices, personal digital assistants (PDAs) and pagers, as well as other miniature or small-footprint devices. The invention can also be used on non-resource constrained devices.

Embodiments of the present invention have a number of advantages. Preventing program control flow modification through call stack manipulation increases program predictability and verifiability. Fixing the amount of memory used for procedure return addresses also increases program verifiability by reducing the state space subject to verification. Additionally, eliminating the call stack reduces stack memory allocation and deallocation.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for statically allocating a procedure return address, comprising:

separating a software program into a cyclic part and an acyclic part, said software program comprising a plurality of procedures, wherein said cyclic part includes at least one possible execution path having a procedure in said plurality of procedures calling itself, directly or indirectly, and said acyclic part includes procedures in said plurality of procedures that are not included in said cyclic part;

allocating a static address for a first procedure return address; and modifying at least one procedure in said acyclic part of said plurality of procedures to refer to said static address for said first procedure return address wherein upon execution of said at least one procedure and said procedure in said cyclic part, said procedure in said cycle part accesses a call stack to obtain a second procedure return address for said procedure in said cyclic part and said static address is used to obtain said first procedure return address without accessing said call stack to obtain said first procedure return address.

2. The method of claim 1 wherein said method further comprises:

analyzing said acyclic part to determine a maximum depth of said procedure return address in all possible call stack configurations; and said allocating further comprises allocating a static address for said procedure return address based upon said maximum depth.

3. The method of claim 2 wherein said analyzing is performed by a compiler.

4. The method of claim 1 wherein said modifying is performed automatically by a tool.

5. The method of claim 2 wherein said static address comprises an address of a call stack configuration at said maximum depth in said all possible call stack configurations.

6. The method of claim 1 wherein said separating further comprises building an acyclic call graph.

7. The method of claim 1 wherein said acyclic part is non-recursive.

8. The method of claim 2, further comprising allocating an area of memory for at least one procedure return address, said area of memory being private to a processor, a size of said area of memory based on said maximum depth.

9. The method of claim 8, further comprising using a return instruction to return from said at least one of said plurality of procedures, said return instruction configured to accept an operand that contains said static address in said area of memory for said at least one of said plurality of procedures.

10. The method of claim 8, further comprising using a return instruction to return from said at least one of said plurality of procedures, said return instruction configured to accept an operand that contains an index into said area of memory for said at least one of said plurality of procedures.

11. The method of claim 8, further comprising using a return instruction to return from said at least one of said plurality of procedures, said return instruction including a static address encoded in said return instruction, said static address referring to a location in area of memory containing a return address for said at least one of said plurality of procedures.

12. The method of claim 8, further comprising using a return instruction to return from said at least one of said plurality of procedures, said return instruction including an index encoded in said return instruction, said index referring to a location in area of memory containing a return address for said at least one of said plurality of procedures.

13. The method of claim 2 wherein said modifying further comprises modifying said software program to indicate said maximum depth.

14. The method of claim 13 wherein said modifying further comprises modifying said software program to include a parameter in said software program, said parameter to indicate said maximum depth.

15. The method of claim 13 wherein said modifying further comprises modifying said software program to include an instruction in said software program, said instruction to indicate said maximum depth.

16. A program storage device readable by a machine, embodying a program of instructions executable by the machine to perform a method for statically allocating a procedure return address, the method comprising:

separating a software program into a cyclic part and an acyclic part, said software program comprising a plurality of procedures, wherein said cyclic part includes at least one possible execution path having a procedure in said plurality of procedures calling itself, directly or indirectly, and said acyclic part includes procedures in said plurality of procedures that are not included in said cyclic part;

allocating a static address for a first procedure return address; and modifying at least one procedure in said acyclic part of said plurality of procedures to refer to said static address for said first procedure return address wherein upon execution of said at least one procedure and said procedure in said cyclic part, said procedure in said cycle part accesses a call stack to obtain a second procedure return address for said procedure in said cyclic part and said static address is used to obtain said first procedure return address without accessing said call stack to obtain said first procedure return address.

17. The program storage device of claim 16 wherein said method further comprises:

analyzing said acyclic part to determine a maximum depth of said procedure return address in all possible call stack configurations; and said allocating further comprises allocating a static address for said procedure return address based upon said maximum depth.

18. The program storage device of claim 17 wherein said static address comprises an address of a call stack configuration at said maximum depth in said all possible call stack configurations.

19. The program storage device of claim 16 wherein said separating further comprises building an acyclic call graph.

20. The program storage device of claim 16 wherein said acyclic part is non-recursive.

21. The program storage device of claim 17 wherein said method further comprises allocating an area of memory for at least one procedure return address, said area of memory being private to a processor, a size of said area of memory based on said maximum depth.

22. The program storage device of claim 21 wherein said method further comprises using a return instruction to return from said at least one of said plurality of procedures, said return instruction configured to accept an operand that contains said static address in said area of memory for said at least one of said plurality of procedures.

23. The program storage device of claim 21 wherein said method further comprises using a return instruction to return from said at least one of said plurality of procedures, said return instruction configured to accept an operand that contains an index into said area of memory for said at least one of said plurality of procedures.

24. The program storage device of claim 21 wherein said method further comprises using a return instruction to return from said at least one of said plurality of procedures, said return instruction including a static address encoded in said return instruction, said static address referring to a location in area of memory containing a return address for said at least one of said plurality of procedures.

25. The program storage device of claim 21 wherein said method further comprises using a return instruction to return from said at least one of said plurality of procedures, said return instruction including an index encoded in said return instruction, said index referring to a location in area of memory containing a return address for said at least one of said plurality of procedures.

26. The program storage device of claim 17 wherein said modifying further comprises modifying said software program to indicate said maximum depth.

27. The program storage device of claim 26 wherein said modifying further comprises modifying said software program to include a parameter in said software program, said parameter to indicate said maximum depth.

28. The program storage device of claim 26 wherein said modifying further comprises modifying said software program to include an instruction in said software program, said instruction to indicate said maximum depth.

29. A Computer-based apparatus for statically allocating a procedure return address, comprising:
    means for separating a software program into a cyclic part and an acyclic part, said software program comprising a plurality of procedures, wherein said cyclic part includes at least one possible execution path having a procedure in said plurality of procedures calling itself, directly or indirectly, and said acyclic part includes procedures in said plurality of procedures that are not included in said cyclic part;
    means for allocating a static address for a first procedure return address; and
    means for modifying at least one procedure in said acyclic part of said plurality of procedures to refer to said static address for said first procedure return address wherein upon execution of said at least one procedure and said procedure in said cyclic part, said procedure in said cycle part accesses a call stack to obtain a second procedure return address for said procedure in said cyclic part and said static address is used to obtain said first procedure return address without accessing said call stack to obtain said first procedure return address.

30. The apparatus of claim 29 wherein said apparatus further comprises:
    means for analyzing said acyclic part to determine a maximum depth of said procedure return address in all possible call stack configurations; and
    said means for allocating further comprises means for allocating a static address for said procedure return address based upon said maximum depth.

31. The apparatus of claim 30 wherein said means for analyzing comprises a compiler.

32. The apparatus of claim 29 wherein said means for modifying comprises an automated tool.

33. The apparatus of claim 30 wherein said static address comprises an address of a call stack configuration at said maximum depth in said all possible call stack configurations.

34. The apparatus of claim 29 wherein said means for separating further comprises means for building an acyclic call graph.

35. The apparatus of claim 29 wherein said acyclic part is non-recursive.

36. The apparatus of claim 30, further comprising means for allocating an area of memory for at least one procedure return address, said area of memory being private to a processor, a size of said area of memory based on said maximum depth.

37. The apparatus of claim 36, further comprising means for using a return instruction to return from said at least one of said plurality of procedures, said return instruction configured to accept an operand that contains said static address in said area of memory for said at least one of said plurality of procedures.

38. The apparatus of claim 36, further comprising means for using a return instruction to return from said at least one of said plurality of procedures, said return instruction configured to accept an operand that contains an index into said area of memory for said at least one of said plurality of procedures.

39. The apparatus of claim 36, further comprising means for using a return instruction to return from said at least one of said plurality of procedures, said return instruction including a static address encoded in said return instruction, said static address referring to a location in area of memory containing a return address for said at least one of said plurality of procedures.

40. The apparatus of claim 36, further comprising means for using a return instruction to return from said at least one of said plurality of procedures, said return instruction including an index encoded in said return instruction, said index referring to a location in area of memory containing a return address for said at least one of said plurality of procedures.

41. The apparatus of claim 30 wherein said means for modifying further comprises means for modifying said software program to indicate said maximum depth.

42. The apparatus of claim 41 wherein said means for modifying further comprises means for modifying said software program to include a parameter in said software program, said parameter to indicate said maximum depth.

43. The apparatus of claim 41 wherein said means for modifying further comprises means for modifying said software program to include an instruction in said software program, said instruction to indicate said maximum depth.

44. A Computer-based apparatus for statically allocating a procedure return address, comprising:
    a call stack tool configured to receive a program implementation, said program implementation comprising a plurality of procedures, said call stack tool further configured to separate said program implementation into a cyclic part and an acyclic part, wherein said cyclic part includes at least one possible execution path having a procedure in said plurality of procedures calling itself, directly or indirectly, and said acyclic part includes procedures in said plurality of procedures that are not included in said cyclic part, said call stack tool further configured to allocate a static address for a first procedure return address, said call stack tool further configured to modify at least one procedure in said acyclic part of said plurality of procedures to refer to said static address for said first procedure return address wherein upon execution of said at least one procedure and said procedure in said cyclic part, said procedure in said cycle part accesses a call stack to obtain a second procedure return address for said procedure in said cyclic part and said static address is used to obtain said first procedure return address without accessing said call stack to obtain said first procedure return address.

45. An apparatus comprising:
a processor; and
a memory coupled to said processor, said memory comprising a program, said program comprising a plurality of procedures, each of said procedures comprising at least one executable instruction, said at least one executable instruction including a procedure return instruction to transfer program control to a calling procedure, said procedure return instruction referring to a static address for a procedure return address without using a call stack to obtain said procedure return address, wherein said static address is allocated using a method comprising:
separating said program into a cyclic part and an acyclic part wherein said cyclic part includes at least one possible execution path having a procedure in said plurality of procedures calling itself, directly or indirectly, and said acyclic part includes procedures in said plurality of procedures that are not included in said cyclic part;
allocating said static address for said first procedure return address; and
modifying at least one procedure in said acyclic part of said plurality of procedures to refer to said static address for said first procedure return address wherein upon execution of said at least one procedure and said procedure in said cyclic part, said procedure in said cycle part accesses said call stack to obtain a second procedure return address for said procedure in said cyclic part and said static address is used to obtain said first procedure return address.

46. The apparatus of claim 45 wherein said apparatus comprises a smart card.

47. The apparatus of claim 46 wherein said smart card comprises a Java Card™ technology-enabled smart card.

48. An apparatus to execute a plurality of instructions comprising a computer program, the apparatus comprising:
a memory;
a processor coupled to said memory, said processor configured to receive said plurality of instructions, said plurality of instructions including an indication of a maximum call stack size for execution of said program, said processor configured to allocate a portion of said memory for at least one procedure return address, the size of said memory portion based upon said indication, said processor further configured to execute said program wherein said portion of memory is used for storing said at lease one procedure return address without using a call stack wherein a location for said storing said at least one procedure return address is allocated using a method comprising:
separating said computer program into a cyclic part and an acyclic part wherein said cyclic part includes at least one possible execution path having a procedure in said plurality of procedures calling itself, directly or indirectly, and said acyclic part includes procedures in said plurality of procedures that are not included in said cyclic part;
allocating said location for said storing said first procedure return address; and
modifying at least one procedure in said acyclic part of said plurality of procedures to refer to said location for said storing said at least one procedure return address wherein upon execution of said at least one procedure and said procedure in said cyclic part, said procedure in said cycle part accesses said call stack to obtain a procedure return address for said procedure in said cyclic part and said location is used to obtain said at least one procedure return address.

49. The apparatus of claim 48 wherein said indication comprises a parameter.

50. The apparatus of claim 48 wherein said indication comprises an instruction.

51. The apparatus of claim 48 wherein said apparatus comprises a smart card.

52. The apparatus of claim 51 wherein
said apparatus comprises a Java Card™ technology-enabled smart card; and
said processor comprises a virtual machine.

* * * * *

UNITED STATES PATENT AND TRADEMARK OFFICE
CERTIFICATE OF CORRECTION

PATENT NO. : 7,181,737 B2
APPLICATION NO. : 10/100838
DATED : February 20, 2007
INVENTOR(S) : Eduard K. de Jong and Pieter H. Hartel It is certified that error appears in the above-identified patent and that said Letters Patent is hereby corrected as shown below:

In Column 15, Line 10, Claim 45, between "address for a" and "procedure", insert --first--.
In Column 16, Line 7, Claim 48, change "lease" to --least--.

Signed and Sealed this

Twenty-ninth Day of May, 2007

JON W. DUDAS
*Director of the United States Patent and Trademark Office*